(12) United States Patent
Sakaibara et al.

(10) Patent No.: US 10,805,770 B2
(45) Date of Patent: Oct. 13, 2020

(54) POSITIONING SYSTEM, BASE STATION, AND POSITIONING METHOD

(71) Applicant: PANASONIC INTELLECTUAL PROPERTY MANAGEMENT CO., LTD., Osaka (JP)

(72) Inventors: Kunihiko Sakaibara, Kanagawa (JP); Jun Shibata, Kanagawa (JP); Toru Okada, Kanagawa (JP); Yasuhisa Yamazaki, Kanagawa (JP); Kazuyuki Yoshino, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/470,830

(22) PCT Filed: Nov. 6, 2017

(86) PCT No.: PCT/JP2017/039847
§ 371 (c)(1),
(2) Date: Jun. 18, 2019

(87) PCT Pub. No.: WO2018/123268
PCT Pub. Date: Jul. 5, 2018

(65) Prior Publication Data
US 2019/0313215 A1    Oct. 10, 2019

(30) Foreign Application Priority Data
Dec. 27, 2016 (JP) .................. 2016-252849

(51) Int. Cl.
*H04W 4/00* (2018.01)
*H04W 4/029* (2018.01)
*G01S 19/04* (2010.01)
*G01S 19/12* (2010.01)
*H04W 72/04* (2009.01)
*H04W 64/00* (2009.01)
*G01S 19/43* (2010.01)

(52) U.S. Cl.
CPC ............ *H04W 4/029* (2018.02); *G01S 19/04* (2013.01); *G01S 19/12* (2013.01); *H04W 64/00* (2013.01); *H04W 72/04* (2013.01); *G01S 19/43* (2013.01)

(58) Field of Classification Search
CPC ...... H04W 4/029; H04W 64/00; H04W 4/023
See application file for complete search history.

(56) References Cited

U.S. PATENT DOCUMENTS 6,263,281 B1 *  7/2001  Yamamoto .............. G01S 5/009
                                                         342/357.59
6,879,283 B1     4/2005  Bird et al.
(Continued)

FOREIGN PATENT DOCUMENTS

JP    10-191455 A     7/1998
JP    2003-043127 A   2/2003
(Continued)

OTHER PUBLICATIONS

International Search Report, dated Jan. 30, 2018, in International Application No. PCT/JP2017/039847.
(Continued)

*Primary Examiner* — Omoniyi Obayanju
(74) *Attorney, Agent, or Firm* — Greenblum & Bernstein, P.L.C.

(57) ABSTRACT

A positioning system includes a receiver that receives a positioning signal from a positioning satellite and generates carrier phase information, a base station that receives the carrier phase information from the receiver, and a communication terminal that performs wireless communication with the base station. The base station transmits information including the carrier phase information and the position information of the receiver as a carrier positioning signal to the communication terminal and the communication terminal performs carrier positioning using the carrier positioning
(Continued)

signal transmitted by the base station. Here, the base station encrypts the position information of the receiver, in the carrier positioning signal to be transmitted.

15 Claims, 3 Drawing Sheets

(56) References Cited

U.S. PATENT DOCUMENTS

| | | | | |
|---|---|---|---|---|
| 2004/0106415 | A1* | 6/2004 | Maeda | G01S 5/0027 455/456.1 |
| 2005/0001763 | A1* | 1/2005 | Han | G01S 19/44 342/357.31 |
| 2007/0055445 | A1* | 3/2007 | Janky | H04K 1/00 701/486 |
| 2016/0011993 | A1 | 1/2016 | Zhu et al. | |

FOREIGN PATENT DOCUMENTS

| | | |
|---|---|---|
| JP | 2003-219448 A | 7/2003 |
| JP | 2010-112725 A | 5/2010 |

OTHER PUBLICATIONS

The Extended European Search Report, dated Dec. 11, 2019 from the European Patent Office (EPO), for the related European Patent Application No. 17886680.2.

* cited by examiner

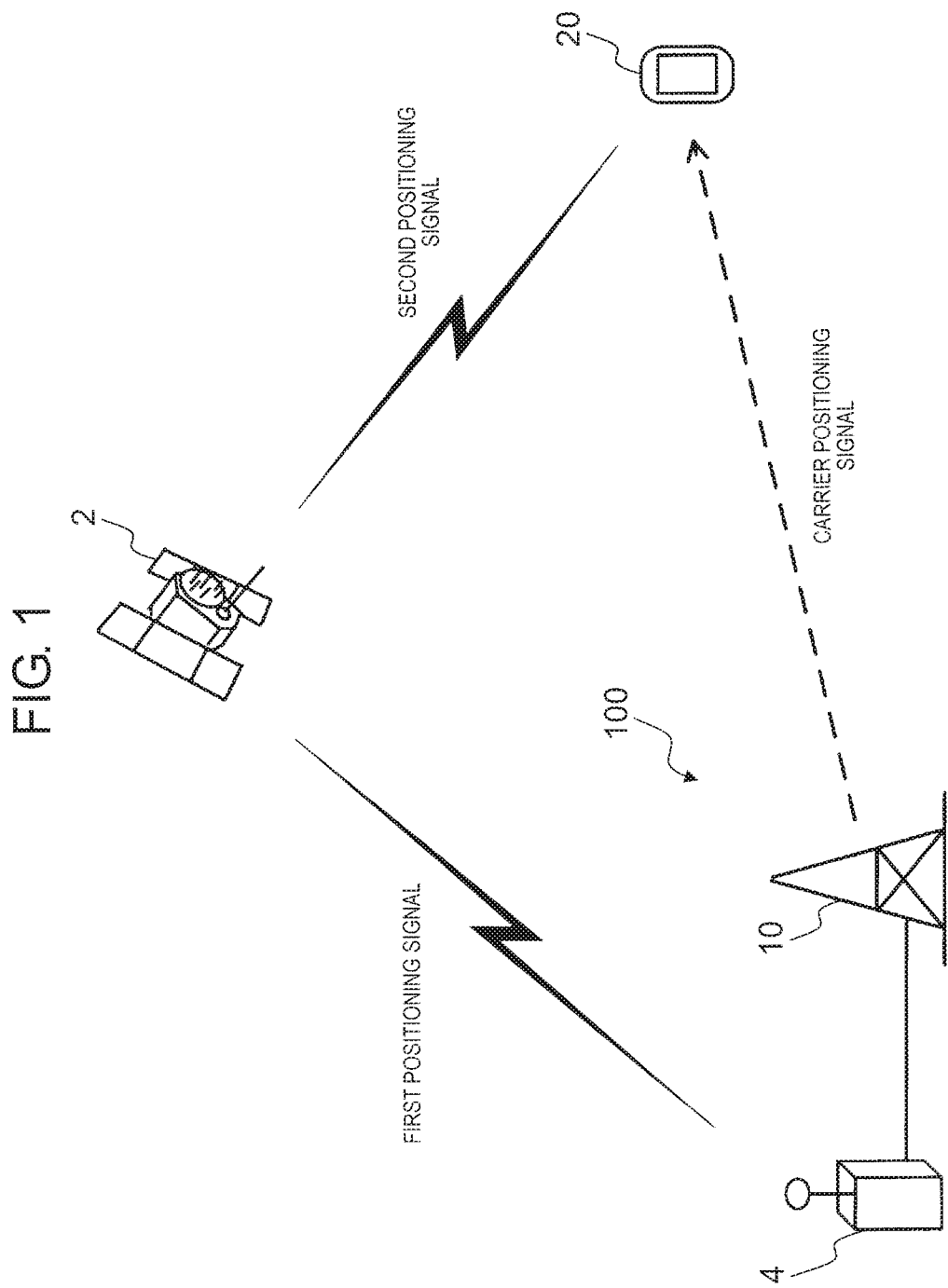

POSITIONING SYSTEM, BASE STATION, AND POSITIONING METHOD

TECHNICAL FIELD

The present disclosure relates to a positioning system, a base station, and a positioning method.

BACKGROUND ART

A system that enables distribution of position correction information in a wide area at a lower cost and realizes high accuracy position measurement in real time by providing a wireless base station of such as a mobile phone system with a function as an electronic reference point and a function of distributing position correction information, has been proposed. Such a system can realize an infrastructure for distributing the position correction information at a lower cost by using wireless base stations which are already set up, especially by using base stations of mobile phone systems which are set up nationwide as reference points.

PTL 1 discloses a position correction information distribution system aimed at enabling distribution of position correction information in a wide area at low cost and realizing high accuracy position measurement in real time. In this system, a base station of a mobile phone system is first used as a reference point. There are many cases where, basically, the base station of a mobile phone system is installed in places where communication environment is good, and the base station of the mobile phone system is well equipped with a power supply, a communication network, and an waste heat environment from the nature of its function. Also, there are many cases where a global positioning system (GPS) is mounted on the base station of the mobile phone system depending on a communication method, and by using the base station, it is possible to set up infrastructure at a lower cost than to set up infrastructure from the beginning. In a method of providing the position correction information, a part of a communication band used by a base station of a mobile phone system to specify a cell where each mobile terminal exists or a part of a communication band of a mobile station is fixedly allocated for providing the position correction information and data is transmitted to the mobile station within a cell area in a broadcast manner, thereby achieving efficiency of data transmission and reducing the communication cost.

CITATION LIST

Patent Literature

PTL 1: Japanese Patent Unexamined Publication No. 2003-219448

SUMMARY OF THE INVENTION

According to technology of PTL 1, although it is possible to perform positioning (position measurement) of a communication terminal that communicates with a base station by position correction information, it is necessary to transmit original position information of a reference station to the communication terminal side. However, since the position information of the reference station can be highly confidential information, there is a problem in applying the position information to an actual positioning process. Also, a problem of traffic shortage may occur due to an increase in data communication amount between the base station and a large number of communication terminals. Therefore, it is necessary to secure transmission of data necessary for the positioning process while coping with such a problem.

The present disclosure relates to technology for smoothly performing positioning of the communication terminal while protecting position information of the base station.

A positioning system of the present disclosure includes a receiver that receives a positioning signal from a positioning satellite and generates carrier phase information, a base station that receives the carrier phase information from the receiver, and a communication terminal that performs wireless communication with the base station, and in which the base station transmits information including the carrier phase information and the position information of the receiver to the communication terminal as a carrier positioning signal, the communication terminal performs carrier positioning using the carrier positioning signal transmitted by the base station, and the base station encrypts the position information of the receiver, in the carrier positioning signal to be transmitted.

A base station of the present disclosure receives carrier phase information generated based on a positioning signal from a positioning satellite from a receiver, transmits information including the carrier phase information and the position information of the receiver to a communication terminal as a carrier positioning signal, and encrypts the position information of the receiver, in the carrier positioning signal to be transmitted.

A positioning method of the present disclosure includes receiving, by a receiver, positioning signal from a positioning satellite to generate carrier phase information, receiving, by a base station, the carrier phase information from the receiver, transmitting, by the base station, information including the carrier phase information and the position information of the receiver to a communication terminal as a carrier positioning signal, and performing, by the communication terminal, carrier positioning using the carrier positioning signal transmitted by the base station, and here, the base station encrypts the position information of the receiver, in the carrier positioning signal to be transmitted.

According to the present disclosure, protection of position information of a reference station can be achieved in wireless communication between a base station and a communication terminal, and data for positioning can be smoothly transmitted.

BRIEF DESCRIPTION OF DRAWINGS

FIG. 1 is a conceptual diagram of a positioning system.

DESCRIPTION OF EMBODIMENT

Figure 2A:
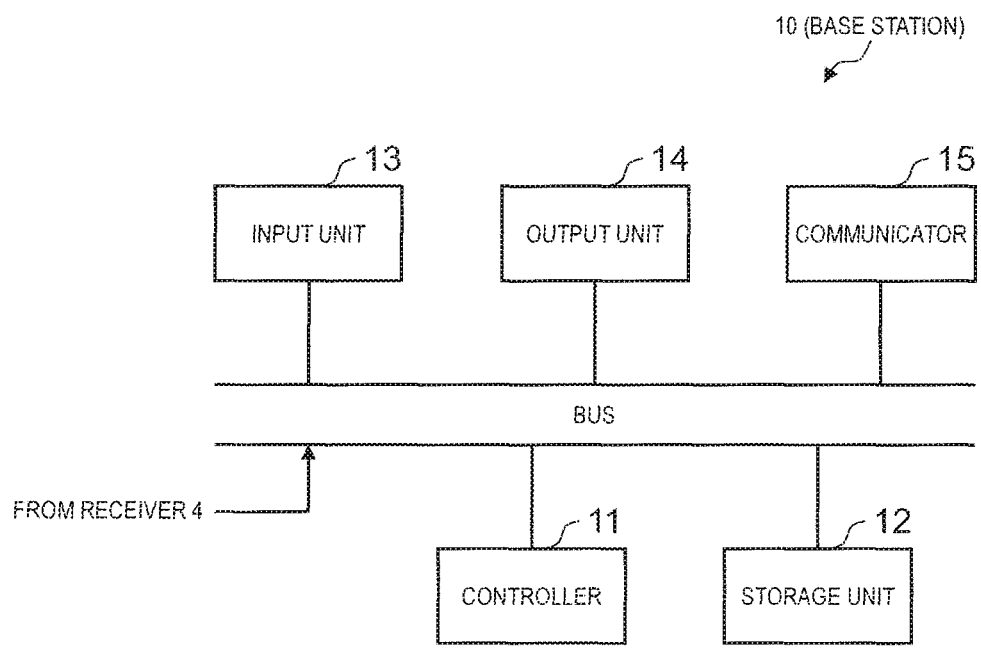
FIG. 2A is a block diagram of a base station constituting a positioning system.

Hereinafter, an embodiment (hereinafter, referred to as "present embodiment") in which a positioning system, a base station, and a positioning method according to the present disclosure are specifically disclosed will be described in detail with reference to the drawings as appropriate. However, more detailed explanation than necessary may be omitted. For example, a detailed description of well-known matters and redundant description of substantially the same configuration may be omitted. This is to avoid unnecessary redundancy of the following description and to facilitate understanding by those skilled in the art. The accompanying drawings and the following description are provided to enable those skilled in the art to fully understand the present disclosure and are not intended to limit the subject matter set forth in claims.

Hereinafter, a preferred embodiment for carrying out the present disclosure will be described in detail with reference to the drawings.

FIG. 1 is a conceptual diagram of a positioning system that receives a wireless signal from a positioning satellite and performs positioning calculation (position measurement) of a communication terminal. Positioning system 100 includes a receiver (reference station) 4, base station 10, and communication terminal 20. Communication terminal 20 can perform positioning calculation and determine its own position by receiving a positioning signal which is a radio wave signal including time information, satellite orbit information, and the like from positioning satellite 2, so that a so-called global positioning system (GPS) is realized. In FIG. 1, only one positioning satellite 2 is illustrated, but a plurality of positioning satellites 2 may be applied to positioning system 100. The present disclosure is not limited to those using the GPS, but can use a global navigation satellite system (GNSS) in its entirety.

Receiver 4 is installed in the vicinity of base station 10 and constantly receives a positioning signal (first positioning signal) from positioning satellite 2. Specifically, receiver 4 can be configured using an apparatus for generating a high accuracy clock installed in base station 10.

Base station 10 performs wireless communication (including data communication and voice communication) with communication terminal 20. A radio wave area that one base station 10 can communicate with communication terminal 20 is a cell, and a wireless communication network covering a wide area is constructed by a large number of cells by a large number of base stations.

As illustrated in FIG. 2A, base station 10 includes controller 11, storage unit 12, input unit 13, output unit 14, and communicator 15. Controller 11 is a processor that comprehensively controls base station 10 as a whole, and storage unit 12 is a memory that stores programs and necessary information. Input unit 13 is a switch, a button, a touch panel or the like by which an operator inputs various kinds of information, and output unit 14 is a display, a speaker or the like for outputting various kinds of information. Communicator 15 is a device exchanging wireless communication with communication terminal 20. As will be described later, base station 10 is connected to receiver 4 described above by wired or wireless connection.

Figure 2B:
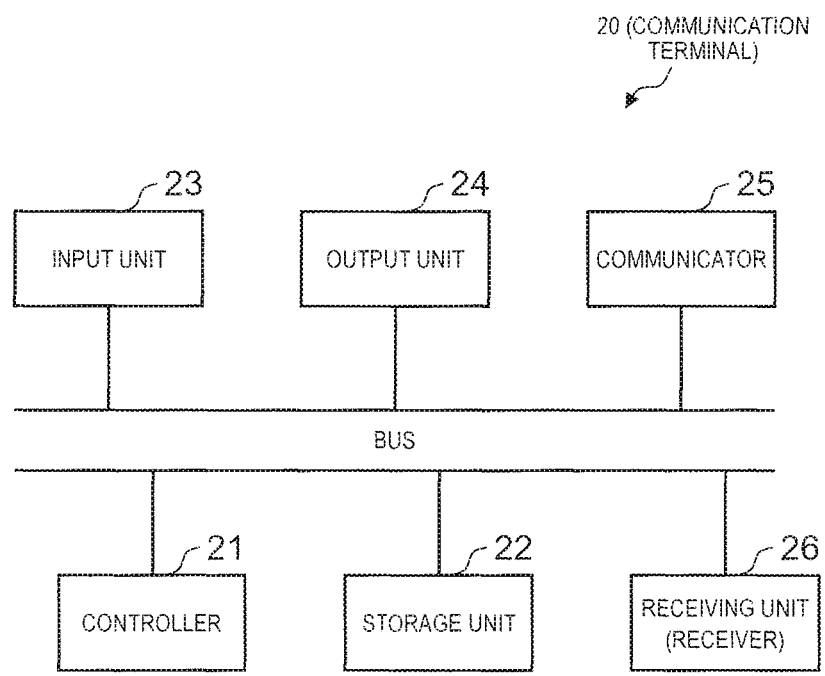
FIG. 2B is a block diagram of a communication terminal constituting the positioning system.

Communication terminal 20 is a mobile terminal carried by a user such as a mobile phone, a smartphone, a tablet, and the like, a navigation system installed in a car, a ship, an airplane, and the like, but is not particularly limited. As illustrated in FIG. 2B, communication terminal 20 includes controller 21, storage unit 22, input unit 23, output unit 24, communicator 25, and receiving unit (receiver) 26. Controller 21 is a processor that comprehensively controls communication terminal 20 as a whole, and storage unit 22 is a memory that stores programs and necessary information. Input unit 23 is a switch, a button, a touch panel or the like by which a user inputs various kinds of information, and output unit 24 is a display, a speaker or the like for outputting various kinds of information. Communicator 25 is a device exchanging wireless communication with base station 10. Furthermore, receiving unit (receiver) 26 is a device that receives a positioning signal (second positioning signal) which is a radio signal from positioning satellite 2.

In this example, as described above, base station 10 is connected to receiver 4 and receives the positioning signal (first positioning signal) from receiver 4. Overwhelmingly large number of base stations 10 are disposed nationwide as compared with existing reference station receivers (meaning reference station receivers (that is, electronic reference stations) installed by public entities such as national government), and covers a wide area wireless communication network. In this example, base station 10 can transmit information based on the positioning signal (the first positioning signal) to communication terminal 20, and play a role equivalent to that of the existing reference station, that is, to play a role as an existing reference station, and becomes possible to perform positioning of communication terminal 20 in a wider area. In an interferometric positioning method, it is desirable that the distance between the reference station and the communication terminal is generally considered to be within 10 km. According to the present example, since the number of receivers 4 connected to base station 10 is sufficient, it becomes easier to satisfy the requirements described above.

The positioning method used in this example is called a relative positioning method. In the relative positioning method of this example, a plurality of receiving devices that receives a positioning signal, such as receiver 4 (base station 10) and a communication terminal 20, respectively receives radio wave signals from the positioning satellite. And, various errors (error of orbit information of the positioning satellite, clock error of the positioning satellite, radio wave delay due to troposphere or ionosphere, and the like) are canceled based on position information obtained from the radio wave signals, on the premise that there is same error when the position information is within a certain relationship of distance. Furthermore, in this example, a so-called interferometric positioning method, among relative positioning methods, is used. The interferometric positioning method calculates the distance between the positioning satellite and the receiving device by using the number of waves of radio waves as a positioning signal. Furthermore, in this example, among the interferometric positioning methods, a real time kinematic (RTK) positioning method that realizes positioning in real time while communication terminal 20 moves is applied.

In the RTK positioning method, positioning with high accuracy is performed using a carrier wave having a frequency of 1.575 GHz, for example, from positioning satellite 2.

An outline of the RTK positioning method will be described. In the RTK positioning method, carrier phase information is sent to the communication terminal together with the position of the reference station. The carrier phase information is information indicating the phase of a radio wave signal (from each positioning satellite) received by a reference station whose position is known. The communication terminal estimates a value of N (assuming that the signal arrived at N wavelengths+α phase of the radio signal emitted from each positioning satellite) from the position of the received reference station, carrier phase information, carrier phase information of the radio signal received by itself, orbit information of the positioning satellite (described in radio signal), and time information of the positioning satellite (described in the radio signal). Since the value of N estimated here has a discrete bias, the value of N is called an integer value bias or integer ambiguity. In this way, the receiving terminal can accurately estimate its own position with an error of approximately the wavelength unit of the radio signal.

However, in this example, the position of the reference station is the position of base station 10 (≈receiver 4). The coordinates (position information) of the base station of a mobile system including receiver (reference station) 4 are highly confidential information, and it is problematic to publicly transmit the coordinates on the wireless communication network of base station 10 and communication terminal 20. In addition to the positioning information, various data are transmitted and received between base station 10 and communication terminal 20. In this example, it is necessary to secure a transmission capacity of data necessary for positioning while coping with the problem of traffic shortage accompanying the increase in data communication amount.

Figure 3:
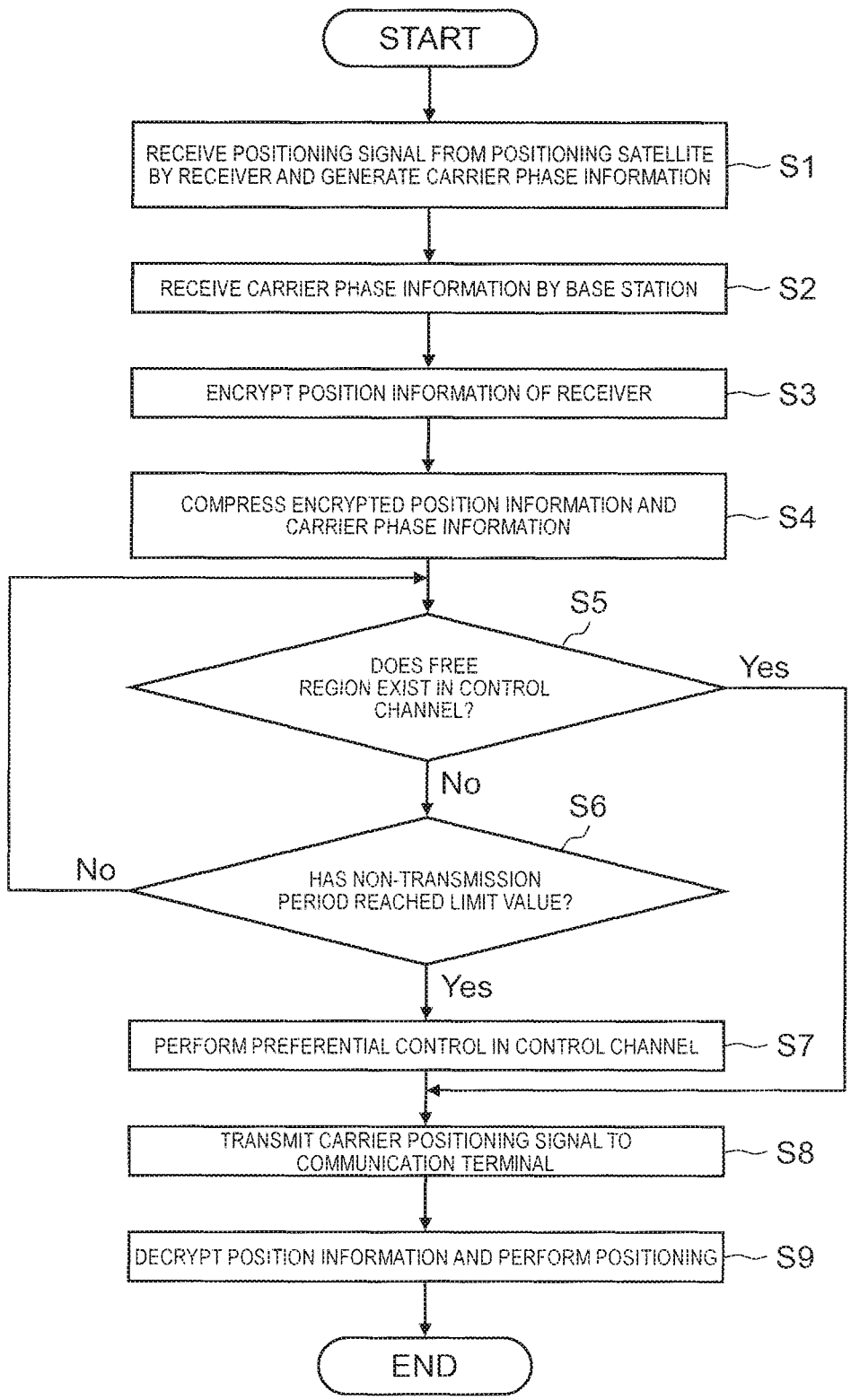
FIG. 3 is a flowchart illustrating a procedure of a positioning calculation process carried out by the positioning system.

FIG. 3 is a flowchart illustrating a procedure of a positioning calculation process carried out by positioning system 100 according to the present disclosure. Positioning system 100 of the present disclosure is adapted to the problem described above.

First, receiver 4 receives a positioning signal from positioning satellite 2 and generates carrier phase information (step S1). Next, base station 10 receives the carrier phase information from receiver 4 (step S2). The carrier phase information is information on the phase of the carrier wave of the positioning signal at the time of reception by receiver 4 and is information that is generally used in the RTK positioning method.

Here, unlike the method of the related art, controller 11 encrypts the position information of receiver 4 which is known in advance using a predetermined method (step S3). By such a procedure, it is possible to protect position information of the highly confidential receiver 4 from a third party.

Furthermore, controller 11 compresses the encrypted position information and the carrier phase information by a predetermined method (step S4). It is the mainstream in the common standard that the position information and the carrier phase information are text code. For this reason, there is a possibility that the position information and the carrier phase information can be compressed to 1/10 with usual compression technology. If the position information and carrier phase information are transmitted as they are, it may be difficult for smooth communication using an important common information area by a mobile phone system or the like, but it is possible to perform smooth transmission by performing the compression process at this point. The compressed information including the position information and the carrier phase information is a carrier positioning signal used by communication terminal 20 for positioning.

Furthermore, controller 11 confirms whether or not a free region (spare time) secured as a spare in advance exists, in the control channel, which is one of the common information areas in the wireless communication with communication terminal 20 (Step S5). The control channel is also called a signaling channel or the like, and is a channel other than a user channel used by the user of communication terminal 20, and is used for transmission of short message service (SMS), for example. The free region is a region used for emergency bulletins, and the like at the occurrence of natural disasters. The confirmation process of the free region is performed by confirming an accumulation amount of a queue in a time slot stored in storage unit 12, for example. In the present disclosure, the common information area is not limited to the control channel described above, and a region used for simultaneous distribution from the base station side to the communication terminal is included in the common information area.

In a case where there is a free region in a control channel (excessive utilization of the control channel due to transmission of other data is not carried out) (Yes in step S5), controller 11 performs allocation processing so as to allocate transmission of the carrier positioning signal including the position information and the carrier phase information to the free region and performs a process of step S8 (transmission to the communication terminal) which will be described later. In a case where the free region does not exist (No in step S5), controller 11 confirms a count of a limit timer built in a separate base station 10, counts a non-transmission period which is the elapsed time (the time during which the carrier positioning signal is not transmitted to communication terminal 20) from the last transmission of the carrier positioning signal including the position information and the carrier phase information and determines whether or not the non-transmission period has reached a predetermined limit value (limit time) (step S6).

Although the limit value of the non-transmission period can be set to, for example, 30 seconds, it can be arbitrarily determined by monitoring a transmission status of data from a queue or the like. The limit value may be freely changed based on predetermined conditions such as season, latitude, longitude (position information), and the like. An appropriate limit value can be set according to the situation by controller 11 changing the limit value stored in storage unit 12 based on date and time information and the position information.

In a case where it is determined that the non-transmission period has not reached the limit value (No in step S6), the process returns to the process of step S5 and controller 11 again starts confirming the free region. On the other hand, in a case where it is determined that the non-transmission period has reached the limit value (Yes in step S6), controller 11 performs preferential control for preferentially allocating the carrier positioning signal to the free region (step S7). This preferential control is performed by interrupting a queue for another process in the control channel so that a queue for transmission of the carrier positioning signal is processed prior to the queue for the other process. Control using the non-transmission period described above is not limited to control using the timer. As another example of the control using the non-transmission period, the preferential control described above may be performed in a case where an unallocated period exceeds a predetermined period by monitoring whether or not a carrier delivery signal is allocated to the transmission queue.

Then, after the allocation process in step S5 (Yes) or the interruption process in step S7, controller 11 transmits the carrier positioning signal including the position information and the carrier phase information compressed through communicator 15 to communication terminal 20 (step S8). Upon receiving the carrier positioning signal, controller 21 of communication terminal 20 decompresses the position information and the carrier phase information of the carrier positioning signal and decrypts the encrypted position information (step S9). This decryption process is performed by using a decryption key received by communication terminal 20 by another communication such as SMS or a decryption key stored in advance in storage unit 22 of communication terminal 20 or a separately attached SIM card or the like. Furthermore, controller 21 carries out the RTK process using the carrier positioning signal (the decrypted position information of receiver 4 and the carrier phase information) and the positioning signal (the second positioning signal) received by receiving unit 26 to perform positioning calculation and perform carrier positioning. As a result, the position of communication terminal 20 is accurately determined.

In the encryption process in step S3, it is preferable that the carrier phase information (other information such as time information) other than the position information of receiver 4 is not to be encrypted. That is, it is preferable to encrypt only the position information of receiver 4. With this configuration, it is possible to reduce the burden of the encryption process and to enable smooth transmission.

Receiver 4 and base station 10 may be integrated apparatuses, in which case the position information of receiver 4 and the position information of base station 10 are equal. Strictly speaking, the position of the antenna of receiver 4 is position information to be transmitted to communication terminal 20. Receiver 26 of communication terminal 20 is not necessarily provided inside communication terminal 20, and may be provided as a receiver separate from communication terminal 20.

While the embodiment of the positioning system, the base station, and the positioning method according to the present disclosure have been described as above with reference to the drawings, the present disclosure is not limited to such an example. It will be apparent to those skilled in the art that various change examples, modification examples, substitution examples, addition examples, deletion examples, and equivalent examples can be conceived within the scope described in the claims, and it will be understood that those examples naturally fall within the technical scope of the present disclosure.

INDUSTRIAL APPLICABILITY

According to the technology of the present disclosure, in the wireless communication between the base station and the communication terminal, protection of the position information of the reference station can be achieved and data for positioning can be smoothly transmitted, so that it is possible to achieve diffusion of positioning technology capable of accurately and smoothly determining the position of the communication terminal.

REFERENCE MARKS IN THE DRAWINGS

2 POSITIONING SATELLITE
4 RECEIVER (REFERENCE STATION)
10 BASE STATION
20 COMMUNICATION TERMINAL
100 POSITIONING SYSTEM

The invention claimed is:

1. A Real Time Kinematic (RTK) positioning system, comprising:
   a receiver that receives a positioning signal from a positioning satellite and generates carrier phase information for RTK positioning, indicating a phase of a positioning signal received at the receiver from the positioning satellite;
   a base station that receives the carrier phase information from the receiver; and
   a communication terminal that performs wireless communication with the base station,
   wherein the base station transmits information including the carrier phase information and position information of the receiver to the communication terminal as a carrier positioning signal, the position information of the receiver having been known in advance,
   the communication terminal calculates a position of the communication terminal by performing the RTK positioning using the carrier positioning signal transmitted by the base station, and
   the base station encrypts the position information of the receiver and does not encrypt the carrier phase information in the carrier positioning signal to be transmitted.

2. The positioning system of claim 1,
wherein the base station transmits the carrier positioning signal in a common information area in wireless communication with the communication terminal.

3. The positioning system of claim 2,
wherein the base station performs, when a non-transmission period during which the carrier positioning signal is not transmitted reaches a predetermined limit value, preferential control for preferentially allocating the carrier positioning signal to the common information area.

4. The positioning system of claim 3,
wherein the base station changes the limit value based on a predetermined condition.

5. The positioning system of claim 1,
wherein the base station performs compression of the carrier phase information and the position information of the receiver.

6. A base station, that:
receives, from a receiver, carrier phase information for Real Time Kinematic (RTK) positioning generated based on a positioning signal received at the receiver from a positioning satellite, and
transmits information including the carrier phase information and the position information of the receiver to a communication terminal as a carrier positioning signal, wherein
   the position information of the receiver has been known in advance,
   the carrier positioning signal is used for calculating a position of the communication terminal by performing the RTK positioning at the communication terminal,
   position information of the receiver, in the carrier positioning signal to be transmitted, is encrypted,
   the carrier phase information, in the carrier positioning signal to be transmitted, is not encrypted, and
   the carrier phase information indicates a phase of the positioning signal received at the receiver from the positioning satellite.

7. The base station of claim 6,
wherein the carrier positioning signal is transmitted in a common information area in wireless communication with the communication terminal.

8. The base station of claim 7,
wherein, when a non-transmission period during which the carrier positioning signal is not transmitted reaches a predetermined limit value, preferential control for preferentially allocating the carrier positioning signal to the common information area is performed.

9. The base station of claim 8,
wherein the limit value is changed based on a predetermined condition.

10. The base station of claim 6,
wherein compression of the carrier phase information and the position information of the receiver is performed.

11. A Real Time Kinematic (RTK) positioning method, comprising:
- receiving, by a receiver, a positioning signal from a positioning satellite to generate carrier phase information for RTK positioning, indicating a phase of the positioning signal received at the receiver from the positioning satellite;
- receiving, by a base station, the carrier phase information from the receiver;
- transmitting, by the base station, information including the carrier phase information and position information of the receiver to a communication terminal as a carrier positioning signal, the position information of the receiver having been known in advance; and
- calculating, by the communication terminal, a position of the communication terminal by performing the RTK positioning using the carrier positioning signal transmitted by the base station,
- wherein the base station encrypts the position information of the receiver and does not encrypt the carrier phase information in the carrier positioning signal to be transmitted.

12. The positioning method of claim 11,
wherein the carrier positioning signal in a common information area is transmitted by the base station in wireless communication with the communication terminal.

13. The positioning method of claim 12,
wherein, when a non-transmission period during which the carrier positioning signal is not transmitted reaches a predetermined limit value, preferential control for preferentially allocating the carrier positioning signal to the common information area is performed by the base station.

14. The positioning method of claim 13,
wherein the limit value is changed by the base station based on a predetermined condition.

15. The positioning method of claim 11,
wherein compression of the carrier phase information and the position information of the receiver is performed by the base station.

\* \* \* \* \*